Dec. 12, 1950 M. J. CHRISTIANSEN ET AL 2,533,919

APPARATUS FOR MANUFACTURING RADIO TUBES

Filed Sept. 11, 1946 8 Sheets-Sheet 1

INVENTORS
M. J. CHRISTIANSEN
R. J. DETUNO
H. W. GARBE
BY E. A. Kane
ATTORNEY

APPARATUS FOR MANUFACTURING RADIO TUBES

Filed Sept. 11, 1946 8 Sheets-Sheet 2

INVENTORS
M.J.CHRISTIANSEN
R.J.DETUNO
H.W.GARBE
BY E. A. Kane
ATTORNEY

Dec. 12, 1950 M. J. CHRISTIANSEN ET AL 2,533,919

APPARATUS FOR MANUFACTURING RADIO TUBES

Filed Sept. 11, 1946 8 Sheets-Sheet 3

INVENTORS
M. J. CHRISTIANSEN
R. J. DETUNO
H. W. GARBE
BY E. S. Kane
ATTORNEY

INVENTORS
M. J. CHRISTIANSEN
R. J. DETUNO
H. W. GARBE
BY E. A. Kaue
ATTORNEY

APPARATUS FOR MANUFACTURING RADIO TUBES

Filed Sept. 11, 1946 8 Sheets-Sheet 5

INVENTORS
M. J. CHRISTIANSEN
R. J. DETUNO
H. W. GARBE
BY E. A. Kane
ATTORNEY

APPARATUS FOR MANUFACTURING RADIO TUBES

Filed Sept. 11, 1946

INVENTORS
M. J. CHRISTIANSEN
R. J. DETUNO
H. W. GARBE
BY E. A. Kane
ATTORNEY

INVENTORS
M. J. CHRISTIANSEN
R. J. DETUNO
H. W. GARBE
BY E. A. Kane
ATTORNEY

APPARATUS FOR MANUFACTURING RADIO TUBES

Filed Sept. 11, 1946 8 Sheets-Sheet 8

INVENTORS
M. J. CHRISTIANSEN
R. J. DETUNO
H. W. GARBE
BY E. A. Kane
ATTORNEY

Patented Dec. 12, 1950 2,533,919

UNITED STATES PATENT OFFICE 2,533,919

APPARATUS FOR MANUFACTURING RADIO TUBES

Milton J. Christiansen and Rocco J. Detuno, Chicago, Ill., and Howard W. Garbe, Madison, N. J., assignors to Western Electric Company, Incorporated, New York, N. Y., a corporation of New York Application September 11, 1946, Serial No. 696,368

4 Claims. (Cl. 113—59)

This invention relates to the manufacture of devices such as, for example, radio tube assemblages and more particularly to combining manufacturing steps of brazing, baking and electrical treating operations on tube assemblages in a single conveyorized apparatus.

An object of this invention is the provision of a simple and practicable apparatus for efficiently, uniformly performing brazing, baking and electrical treating operations on tube assemblages.

In accordance with the general features of this invention, there is provided, in one embodiment thereof as applied to the brazing of copper covers to copper bodies of magnetron tubes and subsequently performing baking and electrical treating operations thereon, an apparatus comprising an intermittently rotatable table having circularly arranged fixtures for supporting the tube assemblages, the table supporting a plurality of exhaust pumps, each of which serves a plurality of tubes. At a loading position, a group of tube assemblages previously secured to their supporting fixtures are subjected to "sealing on" operations preparatory to flushing and exhausting operations and the fixtures are then clamped to the table and then in succession each tube assemblage is indexed to a brazing station, where the assemblage is clamped together and associated with a high frequency coil to braze the body to the covers. At the brazing station, and while the high frequency current is being applied to the first assemblage of the group, the operator causes carbon dioxide to be passed through the group of tubes to flush them and thus prevent oxidation of the internal metal parts of the tube assemblages. After a predetermined time, the carbon dioxide is disconnected and this is followed by the high frequency current being automatically cut off and thereafter the operator connects the brazed tube assemblage to the exhaust pump, all of which is effected shortly before the assemblage enters a stationary baking and electrical treating oven. The advantage of combining the brazing operation with the subsequent operations in an apparatus of this type is that the heat applied to the tube assemblage during the brazing is conserved, thus to appreciably facilitate the subsequent operations. While being intermittently advanced through the oven, the tube assemblages are subjected to combined baking and electrical treatment and exhaust operations. Upon leaving the oven, the tube assemblages pass through successive cooling stations and finally to an unloading position, where "tipping off" operations are effected, and the exhaust pump is disconnected therefrom. Doors are provided at the entrance and exit ends of the oven, which are automatically actuated to permit the assemblages to enter and depart from the oven one at a time, the arrangement being such that the table will not be advanced unless both doors are in a predetermined open position.

Other objects and advantages of this invention will be apparent from the following detailed description taken in conjunction with the accompanying drawings, in which Fig. 1 is a fragmentary plan view of an apparatus embodying the features of this invention;

Figure 2:
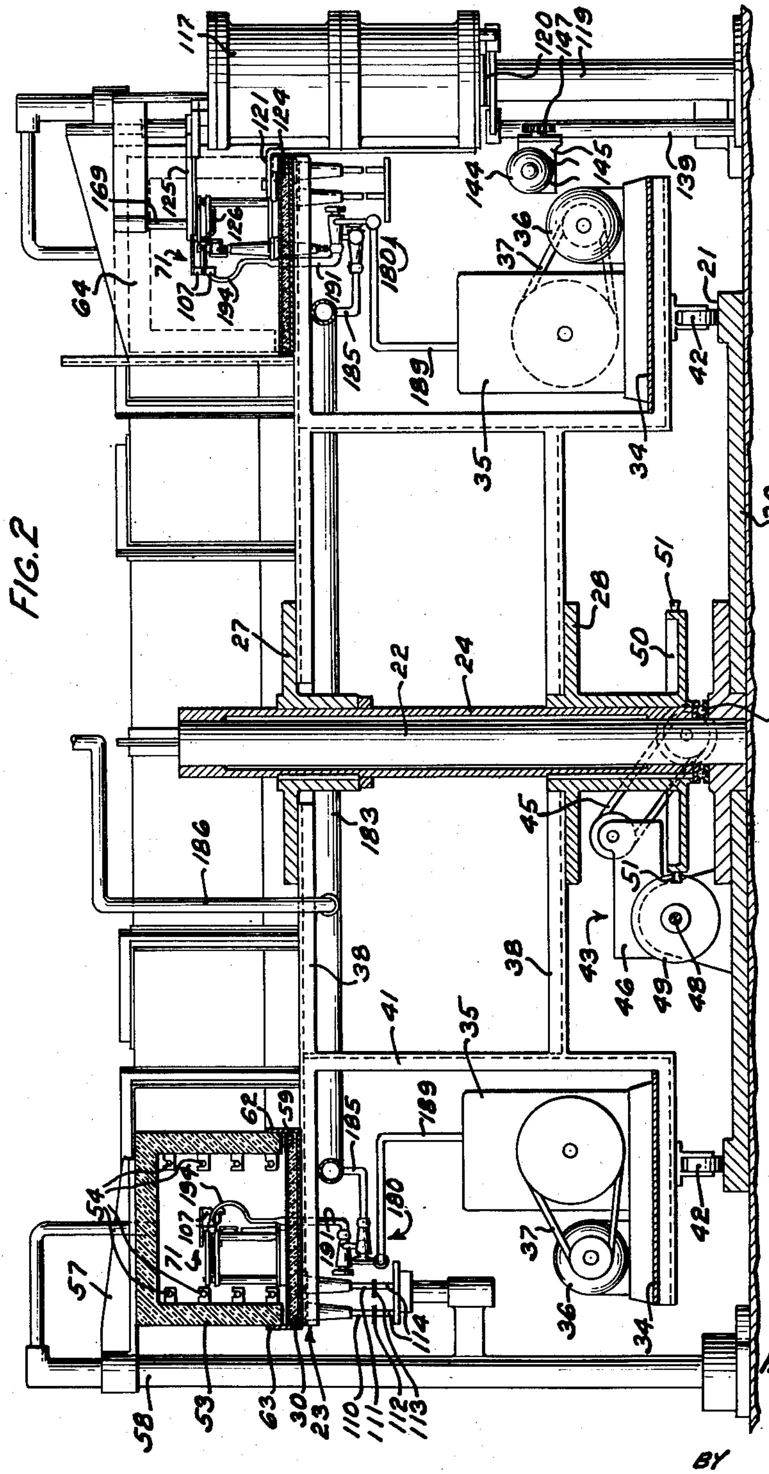
Fig. 2 is a vertical sectional view, taken on the line 2—2 of Fig. 1.
Figure 9:
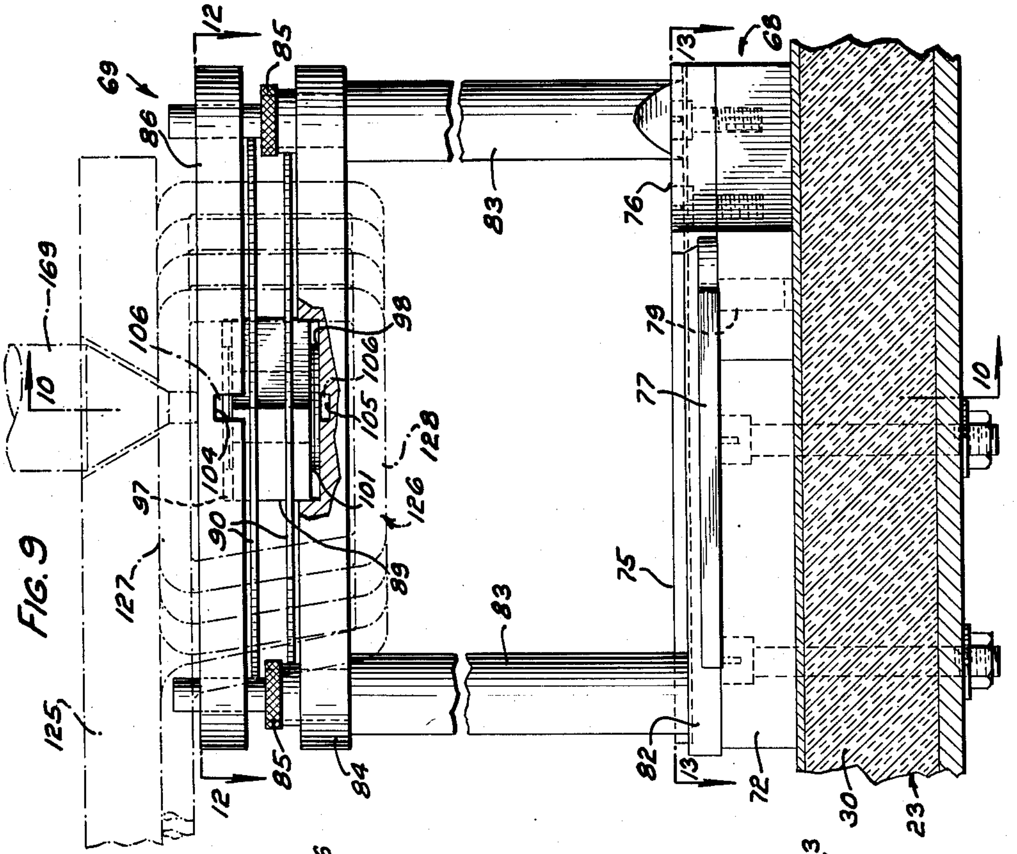
Fig. 9 is an enlarged fragmentary view similar to Fig. 5, partly in section, with the high frequency coil and its support shown in broken outline and showing in greater detail the fixture for supporting the tube assemblage.
Figures 11, 12, 13:
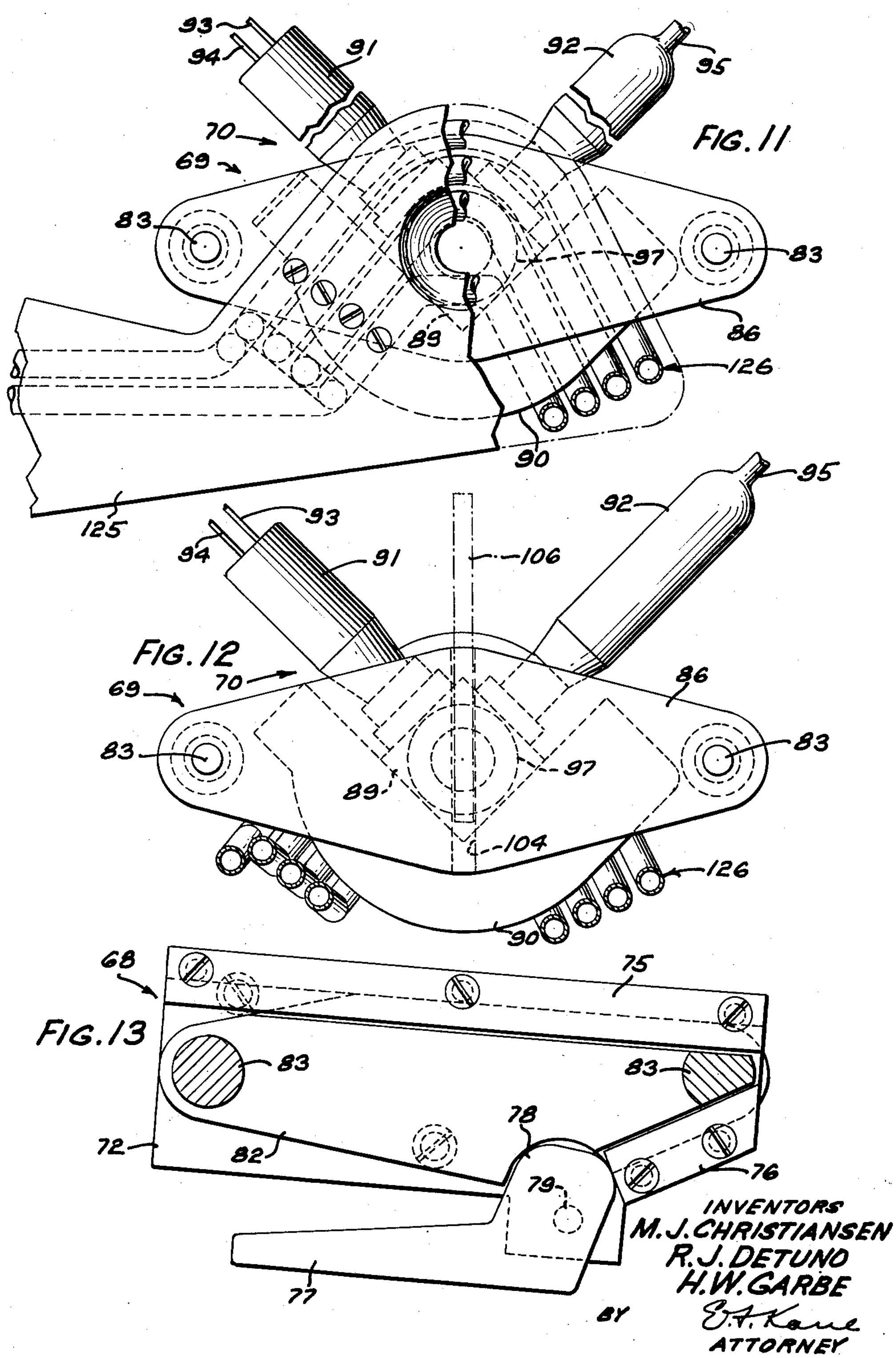
Fig. 11 is a plan view of the structure shown in Fig. 9, the high frequency coil being shown partly in section and its support fragmentarily.
Figures 14, 15:
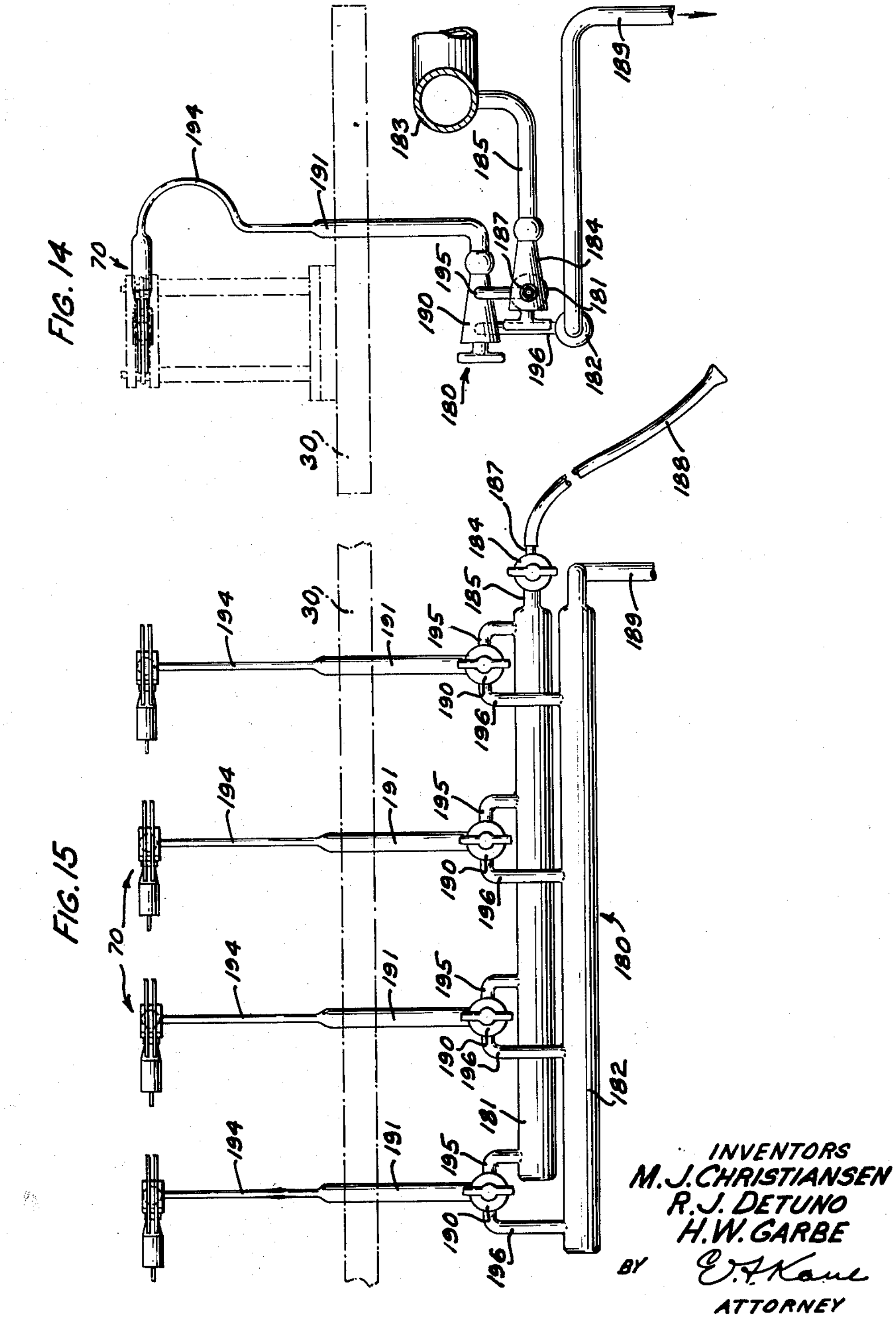
Figure 16:
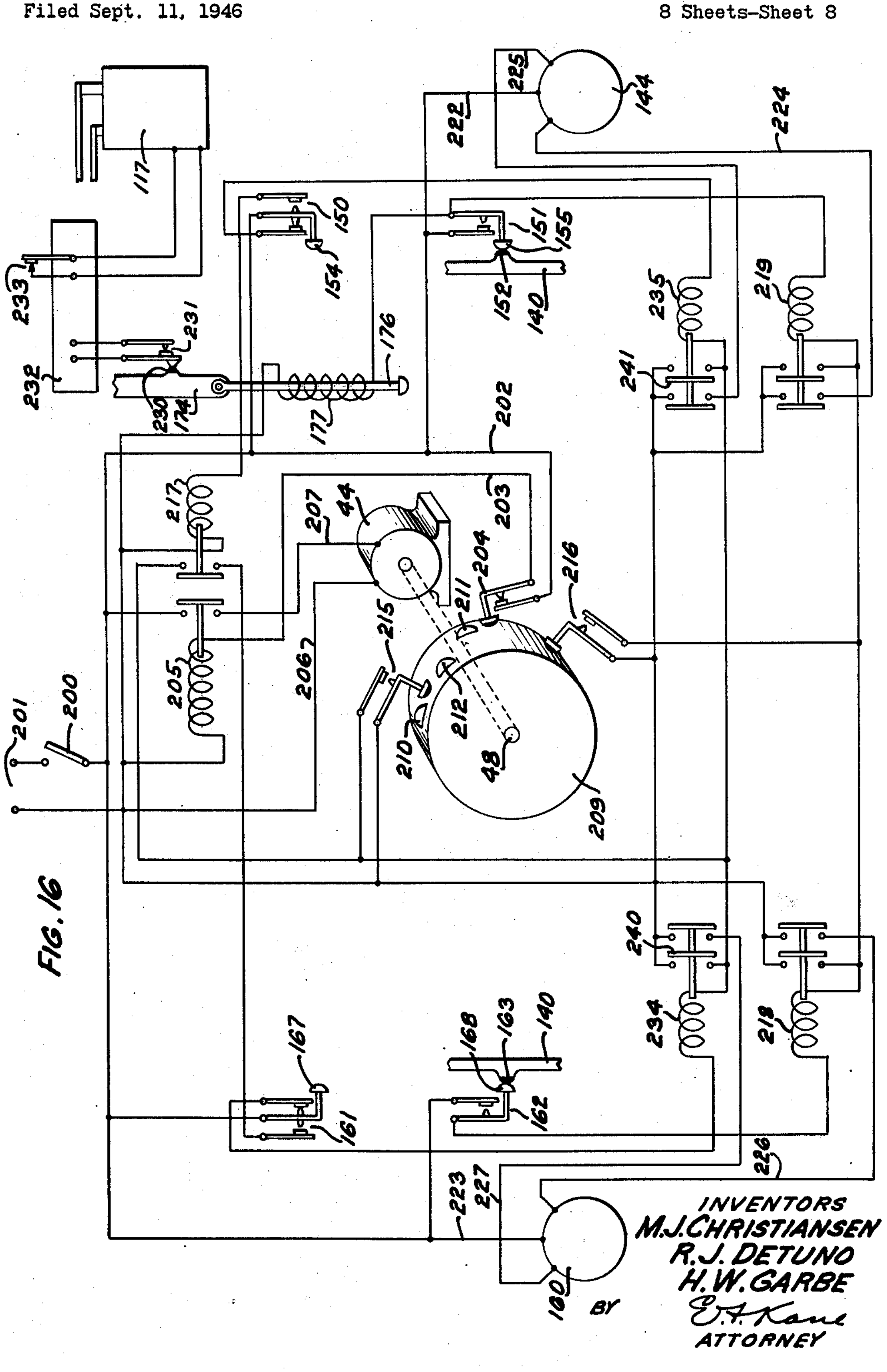

Figs. 12 and 13 are plan sectional views taken on the lines 12—12 and 13—13 of Fig. 9;

Fig. 14 is an enlarged vertical view of the carbon dioxide, exhaust and air connections, control valves and tube assemblages as viewed at the left side of Fig. 2;

Fig. 15 is a view of the connections and control valves shown in Fig. 14 looking at the left side thereof and showing the connections and valves serving a group of four tube assemblages; and Fig. 16 is a diagrammatic view illustrating an electric circuit for controlling the operation of the apparatus.

Figure 1:
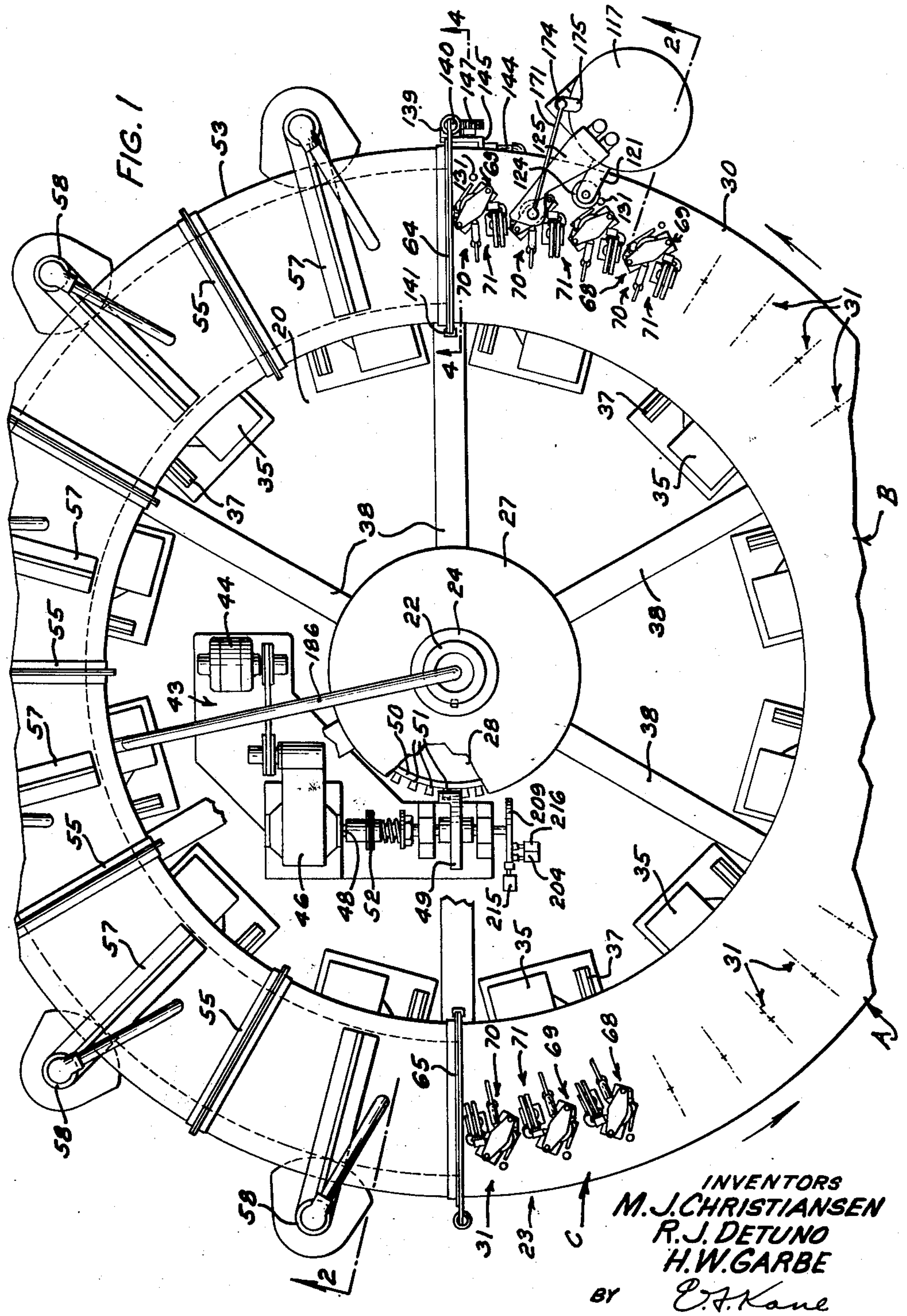

Referring to the drawings in detail and particularly to Figs. 1 and 2, a circular base 20 is provided having a circular track 21 upon its upper surface adjacent its peripheral edge. Fixed centrally to the base 20 is a vertical hollow column 22, upon which is rotatably mounted an intermittently driven circular conveyor, indicated in general at 23. The conveyor 23 comprises a sleeve 24, which surrounds the column 22, and to which are keyed two spaced upper and lower flanged members 27 and 28, the lower member being supported upon a ball bearing 29 arranged between it and the base 20. Fixed to the upper flanged member 27 is an annularly shaped work supporting table 30 having, in the present embodiment of the invention, forty-eight stations, indicated by broken lines at 31—31. Below and movable with the table 30 is an annular platform 34 supporting twelve exhaust pumps 35 and individual electric motors 36 for driving the same through belt and pulleys, indicated at 37, each of the pumps 35 serving four of the stations 31—31. The table 30 and platform 34 are supported by means of spiders 38 and a skeleton framework 41, the spiders being fixed to the flanged members 27 and 28. Depending from and secured to portions of the framework 41, which extends under the platform 34, are a plurality of roller assemblages 42, which ride upon the track 21 on the base 20 in the intermittent rotation of the table 30 and platform 34 about the column 22. The exhaust pump motors 36 are energized from an electrical supply source by means of pick-up brushes rotatable with the conveyor 23 and bearing upon slip rings carried by the stationary column 22 and connected to the supply source. This arrangement for connecting the motor 36 to an electrical supply source has not been illustrated since it forms no part of the invention and is not believed necessary to an understanding thereof.

The conveyor 23 in the present apparatus is moved one-forty-eighth of a complete revolution during each indexing movement thereof by means of a drive mechanism, indicated in general at 43. The mechanism 43 comprises a continuously operating electric motor 44 (Fig. 1) mounted on the base 20 and connected by belt and pulleys 45 to a speed reducer 46. A slow speed output shaft 48 of the speed reducer 46 carries a driving wheel or cam 49 having a single tooth, which is operatively associated with an indexing wheel 50 having forty-eight teeth 51 thereon, the wheel being formed on the lower flanged member 28, which is keyed to the sleeve 24 of the conveyor 23. The shaft 48 is split and carries a spring-held clutch 52, which is adapted to slip in the event that anything interferes with the normal driving of the conveyor 23, thus preventing damage to the apparatus. By means of the drive mechanism 43, the conveyor is rotatably indexed, in a counter-clockwise direction, indicated by the arrows (Figs. 1 and 3), one step or one-forty-eighth of a complete revolution of the conveyor 23 for each complete revolution of the cam 49. A further description of the drive mechanism 43 is not believed necessary for mechanisms of this type are well-known in the art and since a more detailed disclosure thereof is not essential to a complete understanding of the present invention.

Above the table 30 of the conveyor 23 is an arcuate shaped stationary baking and treating oven 53, which extends around one-half of the table and is suitably heated by electrical devices indicated at 54 (Fig. 2). The oven 53 is preferably built from a plurality of individual segments, each carrying a plurality of heating devices 54, and each segment is removable in order to facilitate maintenance. Each segment is dependent from and attached to a horizontal arm 57 fixed to a vertical post 58, which rests upon the surface which supports the base 20. The lower edges of the inner and outer walls of the oven 53 are spaced slightly from the upper surface of the table 30, as indicated at 59, and the interior of the oven is suitably sealed from the surrounding atmosphere by vertical plates 62 and 63 attached to the oven, the lower edges of the plates snugly riding on inner and outer edges of the table 30. At the entrance and exit ends of the oven 53 (Figs. 1, 2, 3 and 4) vertically movable doors 64 and 65, respectively, are provided which are maintained closed between indexing movements of the conveyor 23, the arrangement being such that the conveyor, in a manner to be referred to hereinafter, cannot be rotated until the doors have each been moved to a predetermined open position.

Figures 3, 4:
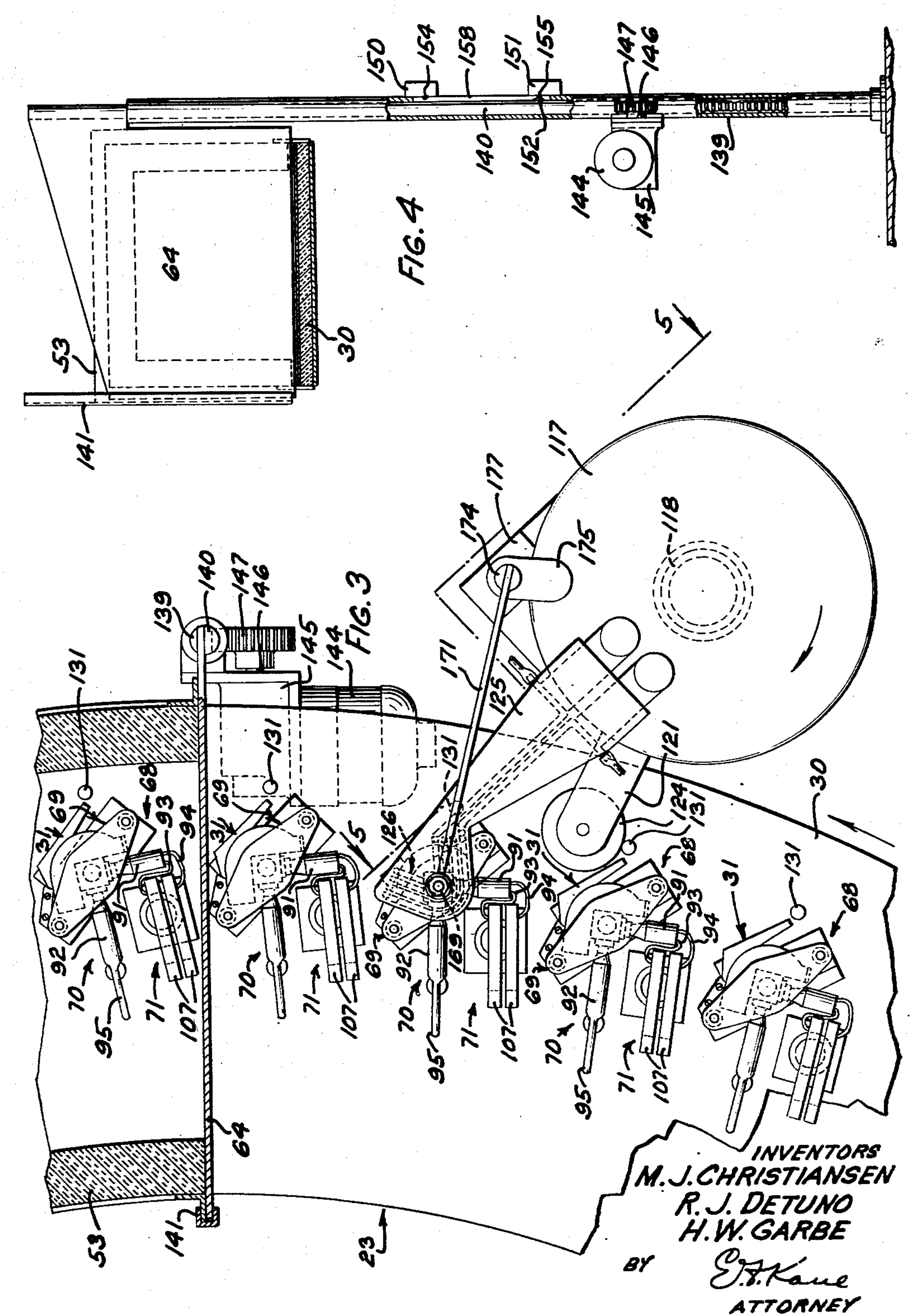
Fig. 3 is an enlarged fragmentary plan view, partly in section, of that portion of the apparatus which includes the brazing position where the tube assemblages are brazed shortly before their entrance in the oven.
Fig. 4 is an enlarged detail vertical view, partly in section, taken on the line 4—4 of Fig. 1 showing the mechanism for actuating the door at the entrance end of the oven.

At each of the stations 31—31 of the table 30, as shown in Figs. 1 and 3, are secured holders 68, to which are clamped fixtures 69 for supporting tube assemblages 70. Each station 31—31 also has a terminal connecting device 71 (Figs. 2 and 3) for supplying the desired voltages to elements of the tube assemblages 70 during their electrical treatment while intermittently advancing through the oven 53. For the sake of simplicity in the drawings, referring to Fig. 1, the holders 68 and devices 71 have been omitted from some of the stations 31—31 and only several stations have been shown equipped with the holders and devices, but it will be understood that each of the 48 stations is similarly equipped.

Each of the fixture holders 68 (Fig. 13) comprises an irregularly shaped base plate 72, to which are fixed undercut bars 75 and 76 for receiving thereunder, in a manner to be presently described, the fixture 69, which is held thereon by a locking lever 77, having a cam-shaped surface 78, the lever being pivotally supported on the plate 72 by a pin 79 carried by the lever and freely fitted in an aperture in the plate.

The tube assemblages 70 are assembled on the fixtures 69 previous to the mounting of the fixtures on the holders 68 in the following manner. Each fixture 69 comprises an irregularly shaped base plate 82 (Figs. 9, 10 and 13), to which are fixed two spaced shouldered vertical posts 83. Fixed against upper shouldered surfaces of the posts 83 is a member 84 of asbestos board, which is clamped in position by thumb screws 85 screw-threaded onto reduced upper ends of the posts. Freely removably mounted on the posts 83, before the fixture 69 with the tube assemblage 70 is secured on the holder 68, is an upper member 86, also of asbestos board.

Figure 10:
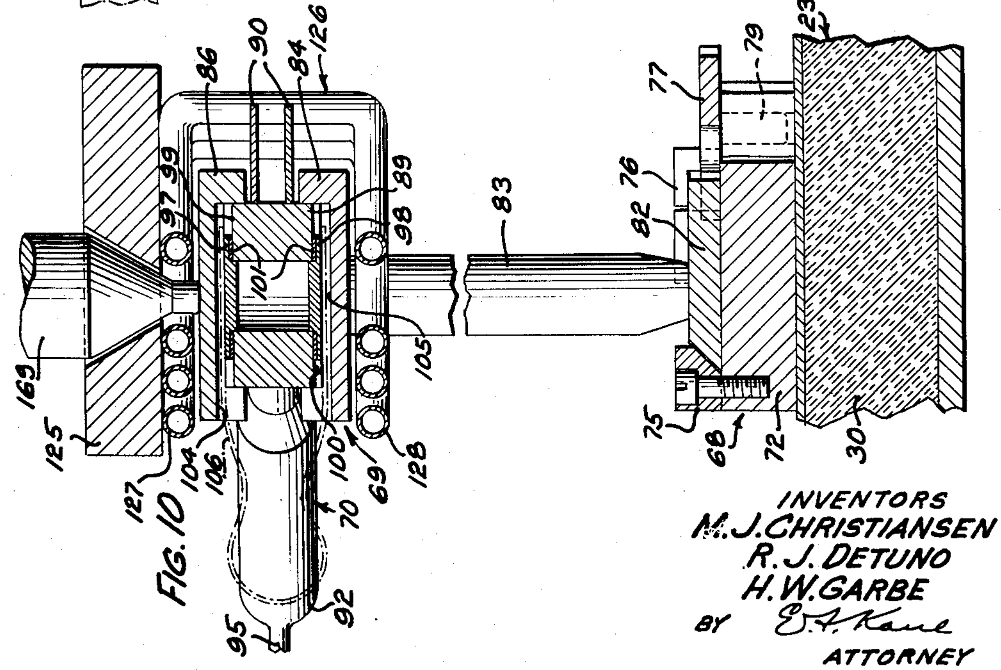
Fig. 10 is a vertical sectional view taken on the line 10—10 of Fig. 9.

The magnetron tube assemblage 70 to be brazed and treated comprises, referring to Figs. 10, 11 and 12, a rectangular shaped copper body or shell 88, having a pair of spaced irregular shaped flanges or fins 89 projecting from two angularly arranged faces of the shell. Extending from and sealed to two other angularly arranged faces of the shell 89 are glass envelopes or tubes 91 and 92, the tube 91 having leading-in wires 93 and 94 extending therefrom and the tube 92 having a reduced axially arranged tubulation 95. In the present apparatus, copper cover plates 97 and 98, which are circular and dish-shaped, are to be brazed to opposite apertured faces 99 and 100, respectively, of the shell 89. Ring-shaped pieces of silver solder 101 (Fig. 10) are placed between the peripheral portions of the cover plates and the shell faces 99 and 100, the solder being fused during the brazing operation to unite the cover plates 97 and 98 to the shell 89. For the purpose of holding the cover plates 97 and 98 in their assembled relation with the shell 89, as shown in Figs. 9 and 10, on the fixture 69, previous to the brazing operation, the opposed surfaces of the members 84 and 86 are formed with slots 104 and 105 for receiving arms of a hairpin type spring 106, which serves to press the cover plates against the surfaces 99 and 100 of the shell.

The terminal connecting device 71 (Figs. 2 and 3), which is provided at each of the stations 31—31, is used to supply electrical current to the tube assemblage leading-in wires 93 and 94. Any suitable type of terminal connecting device 71 may be provided and, in the present embodiment, each of the devices includes a pair of manually actuated weighted contact members 107 (Fig. 3) for contacting the leading-in wires 93 and 94 with associated terminals whereby the leading-in wires will be held in contact with the terminals during the advance of the tube assemblages 70 through the oven 53. The terminals of the devices 71 are connected to contact brushes 110 and 111 (Fig. 2), dependent from the intermittently movable conveyor 23. Suitably arranged commutator plates 112 and 113 (Fig. 2) secured upon insulators 114, spaced at fixed positions along the path of the brushes 110 and 111, and secured to the posts 58 for applying progressively increasing voltages to the filaments of the tube assemblages 70 during their intermittent advance, the commutator plates being connected to suitable current supply sources. A more complete disclosure herein of the means for applying the progressively increasing voltages to the tube assemblage filaments in the operation of the apparatus has been omitted since it is not a part of and is not believed necessary to a complete understanding of the present invention.

Figures 5, 6, 7, 8:
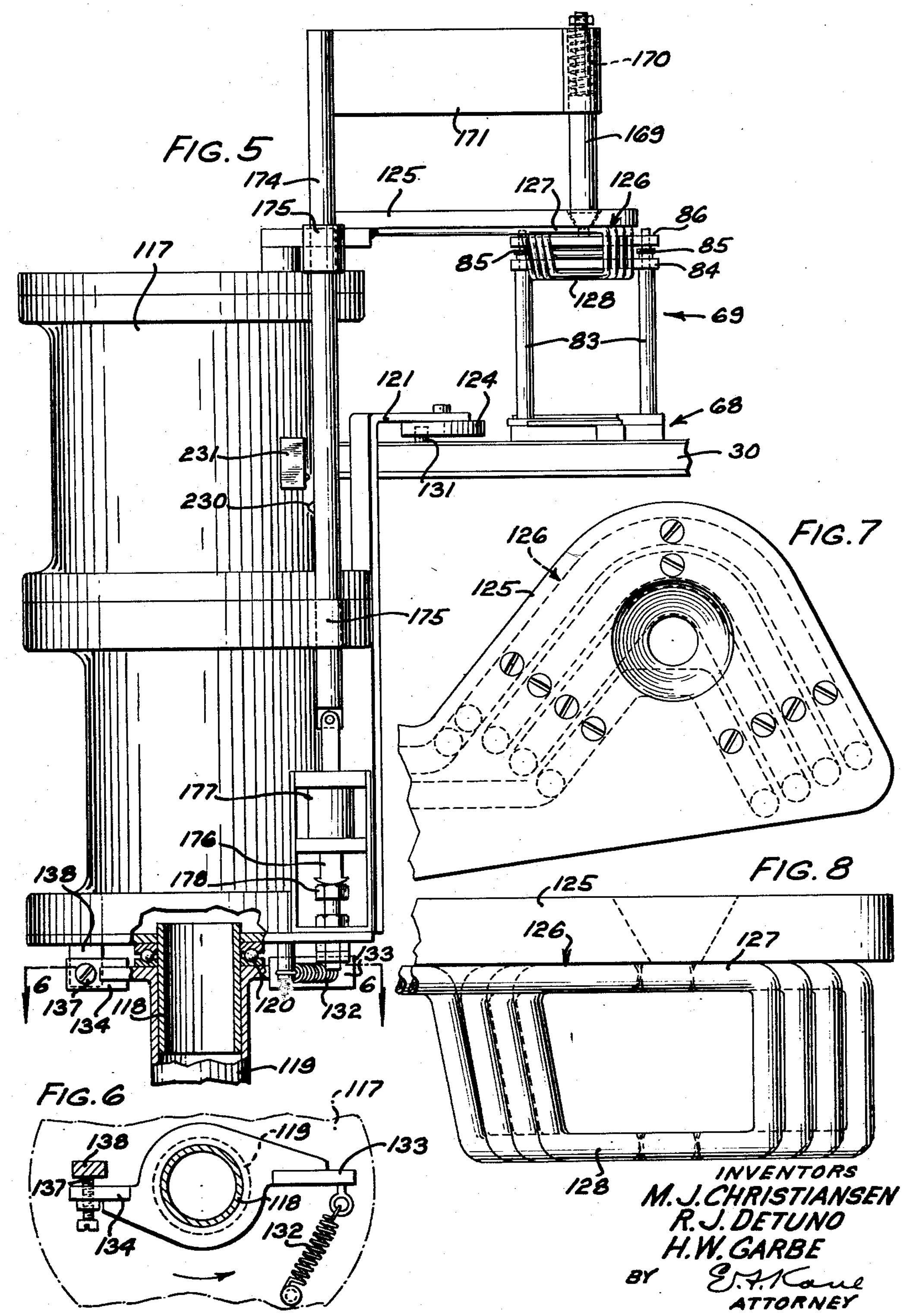
Fig. 5 is a fragmentary vertical elevational view, partly in section, taken on the line 5—5 of Fig. 3, showing a tube assemblage at the brazing position.
Fig. 6 is a plan sectional view taken on the line 6—6 of Fig. 5.
Fig. 7 is a fragmentary enlarged plan view of the high frequency coil and its support, shown in broken outline, at the brazing position.
Fig. 8 is a side elevational view of the coil shown in Fig. 7.

At the right side of the apparatus (Figs. 1, 2, 3, 5 and 6), adjacent the periphery of the conveyor table 30, is a source of high frequency current; in the present instance, a transformer 117, which is pivotally supported on a pivot tube 118 carried upon a fixed standard 119, the pivotal support including a ball bearing 120 (Fig. 5). Fixed to the transformer 117 is a horizontal arm 121, which supports a roller 124 at its outer end, the roller being disposed slightly above the surface of the movable table 30 and adjacent its periphery. Fixed to the upper surface of the transformer 117 is a horizontal arm 125, to which is dependently attached a high frequency heating or brazing coil 126 having the configuration shown in Figs. 7, 8, 9, 10, 11 and 12 and comprising multiple turns of copper tubing through which water is circulated for cooling purposes. V-shaped interconnected side arms 127 and 128 of the coil 126, shaped to provide a maximum of heating at the desired points on the tube assemblages 70, are so spaced apart and arranged relative to the path of travel of the tube assemblages that the assemblages may freely enter therebetween as they are intermittently advanced by the table 30 and come to rest adjacent the entrance to the baking and treating oven 53 (Figs. 1 and 3). Each station 31 of the table 30 is equipped with a pin 131 and, as each tube assemblage 70 comes to a halt in the brazing coil 126, the pin 131 associated with the following station comes to a halt in engagement with the roller 124.

In the next advance of the conveyor table 30, after a brazing operation has been completed, both the tube assemblage 70 and the arm 125 carrying the brazing coil 126 will be advanced. The arrangement is such that the arm 125 supporting the coil 126 will be moved forward and out of the way of the tube assemblage 70 at a faster rate than the tube assemblage, by the pin 131 engaging the roller 124 carried by the arm 121, the pin finally passing the roller. Thus, as the arm 121 moves forward (Fig. 3), the transformer 117 is rotated clockwise about its pivot tube 118 against the action of a tension spring 132 (Figs. 5 and 6), which normally serves to return the transformer 117 and the parts carried thereby to its operative position upon the pin passing the roller (Figs. 1, 3, 5 and 6). The roller 124 will be engaged by the following pin 131 moving into position. The spring 132, as shown in Fig. 6, has its opposite ends attached to the transformer 117 and to a lug 133 fixed to the post 119. A lug 134 on the post 119 carries an adjustable stop screw 137, which cooperates with a lug 138 fixed to the pivotal transformer 117 to accurately position the latter with the parts carried thereon including the roller 124 in its operative position.

The vertically movable doors 64 and 65, at the entrance and exit ends of the oven 53, are mounted and operated by similar means and, although the following description is directed to the door 64, it also applies to the door 65 unless otherwise described. Reciprocably carried in a hollow fixed post 139 (Figs. 3 and 4) is a gear rack 140, to the upper end of which is attached one side of the door 64, the opposite side thereof being guided in a U-shaped member 141 attached to the wall of the furnace 53. Secured to the post 139 intermediate its length is an electric motor 144 for driving a speed reducer 145. Carried by a low-speed or output shaft 146 of the reducer 145 is a pinion 147 meshing with the gear rack 140 through a slot provided in the wall of the post 139.

In order to limit the upward and downward movements of the door 64, the circuit to the motor 144 is controlled by normally closed micro-switches 150 and 151 mounted on the post 139. Carried on the gear rack 140 is a cam-shaped actuator 152 arranged to engage and actuate plungers 154 and 155 of the micro-switches 150 and 151, respectively, to open the motor circuit at the termination of predetermined upward and downward movements of the door 64. The plungers 154 and 155 project from the micro-switches 150 and 151, respectively, through a slot 158 in the wall of the post 139 and into the path of the actuator 152 on the gear rack 140. In a similar manner, the upward and downward movements of the door 65 are controlled by a motor 160 shown in diagrammatic view (Fig. 16), the operation of which motor is controlled by normally closed micro-switches 161 and 162 mounted on a post (not shown) but similar to the post 139. As illustrated diagrammatically in Fig. 16, a cam-shaped actuator 163 is arranged to engage and actuate plungers 167 and 168 of the microswitches 161 and 162, respectively, to open the motor circuit at the termination of predetermined upward and downward movements of the door 65. The plungers 167 and 168 project from the microswitches 161 and 162, respectively, through the slot 158 in the wall of the post 139 and into the path of the actuator 163 on the gear rack in exactly the same manner as illustrated at the entrance end of the furnace.

During the brazing of the cover plates 97 and 98 to the tube shell 89, the cover plates and shell are held together under pressure applied by a spring-pressed plunger 169 (Figs. 5 and 9) supported, as indicated at 170, on one end of an arm 171, the other end of the arm being attached to the upper end of a rod 174 slidably carried in guide members 175 attached to the transformer 117. At its lower end, the rod 174 is connected to a movable core 176 of a solenoid 177. In the operation of the apparatus, a circuit for the solenoid 177, upon being closed, moves the core 176 upwardly and, through the rod 174, the plunger 169 is withdrawn from operative position as shown in Fig. 5 and, upon the circuit for the solenoid being opened, the core 176 and the attached parts move downwardly through the action of gravity to the position shown in Fig. 5, wherein the spring-pressed plunger 169 applies pressure to the cover plates 97 and 98 at opposite sides of the tube shell 89. An adjustable stop 178 serves to limit the downward movement of the solenoid core 176, rod 174 and arm 171.

Associated with each of the exhaust pumps 35 and movable with the intermittently rotatable table 30, is a glass valve unit, indicated in general at 180 (Figs. 2, 14 and 15), for supplying carbon dioxide to each group of four tube assemblages 70 during the period of brazing the first tube assemblage of the group to flush them and thus prevent oxidation of the internal metal parts of the tube assemblages. Also included in each valve unit 180 are means to connect the tube assemblages 70 to the exhaust pump 35 after the flushing and brazing steps and shortly before the assemblages enter the stationary baking and electrical treating oven 53. Each of the glass valve units 180 includes glass manifolds 181 and 182 and each manifold 181 is in communication with a circular steel manifold 183 (Figs. 2 and 14) by means of a three-way valve 184 and a glass conduit 185, the manifold 181 being supplied by a conduit 186 (Fig. 2) connected to a suitable supply source (not shown). The valve 184 may also be operated to shut off the carbon dioxide from the manifold 181 and open it to atmosphere through a conduit 187, to which is attached a rubber hose 188 with a mouth-piece whereby the operator can apply breath pressure during the "sealing on" operation. Each manifold 182 is connected to its exhaust pump 35 by a conduit 189. Arranged above the manifold 181 are four three-way valves 190, from each of which extends a conduit 191 extending upwardly through the table 30 and communicating with the lower end of a glass tubulation 194. At the loading station, the upper ends of tubulations 194 are connected by the operator through a "sealing on" operation to the tubulation 95 of the tube assemblage 70, which operation is well-known in the art of lamp making. This is done in preparation for the flushing and exhausting operations on the tube assemblage. Each valve 190 is also operable for communication with the manifolds 181 and 182 through conduits 195 and 196, respectively. The conduits 185, 187, 189, 191, 195 and 196 of the valve units 180 are also of glass. The manipulation of the various valves of the valve units 180 by the operator during the intermittent operation of the apparatus will be referred to in the general description of operation of the apparatus.

In the operation of the apparatus, the main drive motor 44 will be stopped if the oven doors 64 and 65 are not in proper position to permit the indexing of the table 30, as will be apparent by consideration of the following description of the mode of operation of the various electrically controlled mechanisms in the apparatus, taken in conjunction with Fig. 16. If it be assumed that the operation of the apparatus has been interrupted with the doors 64 and 65 in their lowered positions, the operation may be reinitiated by closing a main switch 200, which will supply current from a 110 volt source 201 to the drive motor 44. With the oven doors 64 and 65 closed, microswitches 151 and 162 will be open and microswitches 150 and 161 will be in their normal position, as shown in Fig. 16. With the switches 150 and 161 in the condition shown in the drawing, power will be supplied over leads 202 and 203 through a closed microswitch 204 to energize a relay 205. Energization of relay 205 will cause it to close its contacts and supply current over leads 206 and 207 to the main drive motor 44. The main drive motor 44, through its shaft 48, drives a control cam 209 having cams 210, 211 and 212 thereon for controlling the operation of switches 215, 204 and 216, respectively. The circuit through the contacts of relay 205 to the drive motor 44 will be maintained as long as switch 204 is closed. Periodically in the cycle, the cam 211 will open switch 204 and the motor 44 will stop unless an auxiliary circuit to relay 205 is maintained by the energization of relay 217 and closure of the normally open contacts of switch 161. Relay 217 operates under control of the switch 150, which is moved to its off-normal position opposite to that shown in the drawing when rack bar 140, carrying the actuator 152, for door 64 is in its uppermost position. The circuit for energizing relay 217 thus runs from the left-hand side of the 110 volt line through the relay coil, normally open contacts of switch 150, and back to the other side of the 110 volt line. From the foregoing, it will be apparent that relay 217 is energized when door 64 reaches its uppermost position. However, the circuit to the motor 44 should not be maintained unless both of the doors 64 and 65 are in their uppermost position and, therefore, the current to hold relay 205 energized when switch 215 is open is supplied from the right-hand side of the 110 volt line through switch 161 in its off-normal position through the contacts of relay 217 to the winding of relay 205 and back to the left side of the 110 volt line. Thus, if the doors 64 and 65 are in their uppermost position at the time that cam 211 opens switch 204, motor 44 will continue to operate and will index the table 30. As pointed out hereinbefore, switches 151 and 162 will close when the doors 64 and 65 move from their lowermost position and thus will prepare a circuit for driving the doors downwardly. As the control cam 209 continues to rotate, cam 212 will close switch 216 to supply current from the left-hand side of the 110 volt line to the windings of relays 218 and 219. Since the doors are now in their uppermost position, the circuit to relays 218 and 219 will be completed through switches 162 and 151, respectively, and back to the right-hand side of the 110 volt line 201 to initiate the downward movement of the doors by supplying energizing current to one winding of each of door operating motors 168 and 144.

Motors 144 and 168 are reversible motors connected over leads 222 and 223, respectively to the right-hand side of the 110 volt line through switch 208. One winding of the motor 144, which will cause it to operate in a direction to drive the door 64 downwardly, may be energized over a lead 224 and another winding of the motor, which will cause it to drive the door upwardly, may be energized over a lead 225. Similarly, motor 168 may be energized to cause it to drive its door 65 downwardly by supplying current from the left-hand side of the 110 volt line over a lead 226 and conversely may be supplied with current over a lead 227 to cause it to drive its door upwardly.

By energization of relays 218 and 219, the left-hand side of the 110 volt line may be connected over their contacts to the leads 224 and 226, thus to initiate downward movement of the two doors. When relays 218 and 219 are energized, they will lock up over a circuit from the left-hand side of the 110 volt line through their contacts and through the contacts of switches 162 and 151 back to the right-hand side of the 110 volt line. Thus the circuit to relays 218 and 219 once made will be maintained unless the doors 64 and 65 reach their proper position and open the switches 151 and 162, at which time relays 218 and 219 will be de-energized and cannot be re-energized until the doors move upwardly again.

As soon as door 64 reaches its lowermost position and opens switch 151, solenoid 177 will be de-energized simultaneously with the de-energization of relay 218, thus to permit the clamping plunger 169 to drop by the action of gravity to clamping position. The rod 174 associated with clamping plunger 169 is provided with a camming surface 230, which closes a switch 231 of a timer 232, which may be any suitable timer capable, upon initiation of operation, to close contact pair 233 and hold them closed for a predetermined interval of time and then open. The timer 232 will thus supply current through the contacts 233 from a suitable source through the transformer 117 to the high frequency coil 126 and will automatically cut off a supply of current to the transformer after a brazing operation has been completed.

Since during the brazing operation the shaft 48 continues to turn without, however, moving the table 30, the shaft 48 will, after a predetermined interval, bring the cam 210 into position to close switch 215. When switch 215 closes, it will supply current to energize relays 234 and 235, which, upon energization, will connect leads 227 and 225 to the left-hand side of the 110 volt line to drive the motors 168 and 144 in a direction such that they will move the doors 65 and 64 upwardly. Closure of switch 215 will momentarily connect the left-hand side of the 110 volt line through the windings of relays 234 and 235 and normally closed contacts of switches 161 and 154 back to the right-hand side of the 110 volt line. The relays 234 and 235 will thus be energized and when they close their contacts, they will be locked up over their locking contacts 240 and 241 until the doors 65 and 64, in reaching their uppermost position, open switches 154 and 161, respectively, at which time the locking circuit for relays 234 and 235 will be disabled with the doors in their uppermost position. As long as the doors have reached their proper position, the motor 44 will continue to operate as described hereinbefore and a cycle of operation will be reinitiated. It should be noted that as soon as rack bar 140 for door 64 started to move upwardly, it permitted switch 151 to close, thus to supply current to solenoid 177 and move the clamping plunger 169 out of clamping position.

The operation of the apparatus, it is believed, will be understood from the above-detailed description, but may be briefly summarized as follows: Upon each group of four processed tube assemblages 70, which at this time are connected to the associated exhaust pump 35 by means of the valve unit 180, and upon being intermittently advanced from the exit end of the oven 53, arriving at an unloading position, indicated in general at A (Fig. 1), the four assemblages are individually sealed off by an operator from the conduits 191 and the tubulations 194 of the valve unit 180 by what is generally known in the art as a "tipping off" operation. As each assemblage is sealed off, the operator turns the associated valve 190 (Figs. 14 and 15) so that the conduits 191 and tubulations 194 will be cut off from the exhaust pump 35 and opened to atmosphere through the conduit 187. The seal-off assemblages 70, with their supporting fixtures 69, are then removed from the holders 68 secured to the table 30 and at a loading position, indicated in general at B (Fig. 1), four tube assemblages 70, to be brazed, treated and baked, and previously secured to fixtures 69 are individually sealed onto the tubulations 194 of the valve unit 180 by what is generally known in the art as a "sealing on" operation and the fixtures 69 are clamped to the holders 68.

In the further intermittent advance of the group of four assemblages 70, the leading assemblage of the group enters the brazing coil 126 and, in the manner previously described, the plunger 169 is lowered to hold the cover plates 97 and 98 of the tube shell 89 pressed together and the coil 126 is energized. While the high frequency current is being applied to the assemblage, a second operator turns the valve 184 to such a position that the conduit 185 from the carbon dioxide supply manifold 183 is in communication, through the manifold 181 and the conduit 195, with the valve 190 associated with the assemblage 70 being brazed. The valve 190, having been turned to open the conduit 195 to the conduit 191, carbon dioxide will be supplied to the assemblage 70 through the tubulation 194 for flushing the assemblage to prevent oxidation of the internal metal parts thereof. As the valve 184 is thus turned to supply the carbon dioxide to the assemblage, it will be understood that the valve is cut off from atmosphere through the conduit 187. Each assemblage of the group is flushed and brazed upon being advanced into alignment with the brazing coil in the above-described manner. After a predetermined period of flushing, the operator turns the valve 184 of the valve unit 180 to such a position that the carbon dioxide is cut off from the assemblages. Thereafter, in the manner previously described, the high frequency current is cut off from the coil 126, whereupon the operator turns the valve 190 to connect the flushed and brazed assemblage to the exhaust pump 35 through the conduits 189 and 196 and manifold 182.

Before each assemblage enters the oven 53, preferably while it is at the station between the brazing station and the oven door 64, the second operator connects the leading-in wires 93 and 94 of the assemblage to the terminal connecting device 71 in the manner previously described, whereby progressively increasing voltages will be applied to the elements of the tube assemblages for electrically treating the same as they intermittently advance through the baking oven 53.

Thereafter, the doors 64 and 65 are raised and the previously processed assemblage 70, now in the position between the door 64 and the brazing station, and which has been connected to the exhaust pump 35 and the elements of which are connected for electrical treatment, enters the oven 53 through the open door 64 for baking and electrical treatment. At the same instant, as an assemblage 70 enters the oven 53, a baked and electrically treated assemblage leaves the oven through the open door 65 and another assemblage enters the brazing coil 126 to be flushed, brazed and connected to the exhaust pump in the manner just described. As the assemblages leave the oven and intermittently advance to the unloading position A, they pass through successive cooling stations indicated at C (Fig. 1).

It is evident from the foregoing description that a very practicable and efficient intermittently actuated apparatus is provided whereby radio tube assemblages may be carbon-dioxide flushed and brazed on a single conveyorized apparatus and subsequently treated to exhaust operations, oven baking and electrical treatment. The arrangement is such that the heat applied to the assemblage during the brazing operation is in a great measure conserved, thereby facilitating the subsequent operations. Also, by means of the electrical interlocking control circuits, including the feature of opening the energizing circuit to the main motor to stop the operation of the apparatus unless the oven doors are in a predetermined open position, a decided advantage is provided in an apparatus of the type above described.

What is claimed is:

1. An apparatus for conveying and brazing work piece assemblages comprising an intermittently actuated conveyor for carrying assemblages, heating means mounted for movement laterally of and into the path of movement of a work piece assemblage with which a work piece assemblage is aligned at the termination of each actuation of said conveyor for brazing, means movable with said heating means into alignment with the work piece assemblage for applying pressure to work piece assemblages during their brazing, means for effecting movement of said pressure applying means at an angle to its direction of movement with said heating means to apply pressure to the work piece assemblage, means on said conveyor for operative association with said heating means during each actuation of said conveyor for moving said heating and pressure applying means out of the path of the brazed assemblage, means for returning said heating and pressure applying means into the path of a following assemblage to be brazed, and means for intermittently actuating said conveyor and effecting said other movement of said pressure applying means in timed relation.

2. An apparatus for conveying and heat treating articles comprising, an intermittently actuated conveyor for carrying articles, pivotal heating means with which an article is aligned at the termination of each actuation of said conveyor, means for pivotally supporting said heating means, a roller carried by said supporting means adjacent the upper surface of said conveyor, a plurality of pins extending from said conveyor surface arranged to engage in succession said roller at the termination of each actuation of said conveyor and upon actuation of said conveyor to move said heating means out of the path of the heated article, means for returning said heating means on its pivotal supporting means into the path of a following article to be heated and for returning said roller into the path of a following pin, and means for intermittently actuating said conveyor.

3. An apparatus for conveying and brazing work piece assemblages comprising an intermittently actuated conveyor for carrying assemblages, intermittently effective pivotal heating means with which a work piece assemblage is aligned at the termination of each actuation of said conveyor, a plunger movable with said heating means and gravity actuated for applying pressure to the work piece assemblages during their brazing, solenoid actuated means movable with said heating means for retracting said plunger, means for pivotally supporting said heating means, a roller carried by said supporting means adjacent the upper surface of said conveyor, a plurality of pins extending from said conveyor surface arranged to engage in succession said roller at the termination of each actuation of said conveyor and upon actuation of said conveyor to move said heating means out of the path of the brazed assemblage, means for returning said heating means on its pivotal supporting means into the path of a following assemblage to be heated and said roller into the path of a following pin, and means including a control circuit automatically operable for intermittently actuating said conveyor and plunger and for controlling the effectiveness of said heating means in a predetermined cyclic order.

4. An apparatus for conveying and brazing work piece assemblages comprising an intermittently actuated rotary conveyor for carrying assemblages, heating means spaced from the upper surface of said conveyor and mounted for movement laterally of and into the path of movement of a work piece assemblage with which a work piece assemblage is aligned at the termination of each actuation of said conveyor for brazing, a plunger movable first in one direction with said heating means into alignment with the work piece assemblage for applying pressure to work piece assemblages during their brazing, means for effecting movement of said plunger at an angle to its first movement to apply pressure to the work piece assemblage, means on said conveyor for operative association with said heating means during each actuation of said conveyor for moving said heating means and plunger out of the path of the brazed assemblage, means for returning said heating means and plunger into the path of a following assemblage to be brazed, and means for intermittently actuating said conveyor and effecting said other movement of said pressure applying plunger in timed relation.

MILTON J. CHRISTIANSEN.
ROCCO J. DETUNO.
HOWARD W. GARBE.

(References on following page)

REFERENCES CITED

The following references are of record in the file of this patent:

UNITED STATES PATENTS

| Number | Name | Date |
|---|---|---|
| 1,758,004 | Madden | May 13, 1930 |
| 1,884,683 | Hermani | Oct. 25, 1932 |
| 1,885,992 | Coyle | Nov. 1, 1932 |
| 2,069,386 | Palucki | Feb. 2, 1937 |
| 2,082,080 | Palucki | June 1, 1937 |
| 2,162,209 | Trutner | June 13, 1939 |
| 2,213,317 | Lathrop | Sept. 3, 1940 |
| 2,264,496 | Wollentin et al. | Dec. 2, 1941 |
| 2,344,534 | Bucknam | Mar. 21, 1944 |
| 2,394,467 | Muller | Feb. 5, 1946 |
| 2,401,930 | Hansen | July 11, 1946 |
| 2,432,794 | Pearson | Dec. 16, 1947 |

FOREIGN PATENTS

| Number | Country | Date |
|---|---|---|
| 492,768 | Germany | Mar. 1, 1930 |